US008626894B2

(12) United States Patent
Chen et al.

(10) Patent No.: US 8,626,894 B2
(45) Date of Patent: Jan. 7, 2014

(54) GENERATING VISUALIZATION OUTPUT OF EVENT CORRELATION INFORMATION

(75) Inventors: Xiaoping Chen, Austin, TX (US); Andrew Jason Lavery, Austin, TX (US); Howard Milton McKinney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2334 days.

(21) Appl. No.: 10/875,942

(22) Filed: Jun. 24, 2004

(65) Prior Publication Data

US 2005/0289230 A1 Dec. 29, 2005

(51) Int. Cl.
*G06F 15/173* (2006.01)

(52) U.S. Cl.
USPC ........................................................ 709/224

(58) Field of Classification Search
USPC .................................................. 709/223, 224
See application file for complete search history.

(56) References Cited

U.S. PATENT DOCUMENTS

| | | | | |
|---|---|---|---|---|
| 6,393,386 | B1 * | 5/2002 | Zager et al. ...................... | 703/25 |
| 2002/0073195 | A1 * | 6/2002 | Hellerstein et al. ............ | 709/224 |
| 2002/0120734 | A1 * | 8/2002 | Riosa et al. .................... | 709/224 |
| 2002/0123947 | A1 | 9/2002 | Yuste et al. ....................... | 705/35 |
| 2002/0158918 | A1 * | 10/2002 | Feibush et al. ................. | 345/853 |
| 2002/0194246 | A1 | 12/2002 | Moskowitz et al. .......... | 709/102 |
| 2003/0074439 | A1 | 4/2003 | Grabarnik et al. ............ | 709/224 |
| 2003/0140280 | A1 | 7/2003 | Kaler et al. ...................... | 714/37 |
| 2003/0200293 | A1 * | 10/2003 | Fearn et al. .................... | 709/223 |
| 2004/0090472 | A1 * | 5/2004 | Risch et al. .................... | 345/853 |
| 2005/0283680 | A1 * | 12/2005 | Kobayashi et al. ............. | 714/39 |

FOREIGN PATENT DOCUMENTS

JP 2001306998 11/2001

OTHER PUBLICATIONS

Thoenen et al., "Event Relationship Networks: A Framework for Action Oriented Analysis in Event Management", 2001 IEEE Online Library, Session Sixteen, Fault Management II, pp. 593-606.
Fernyhough et al., "Building Qualitative Event Models Automatically from Visual Input", IEEE Online Library, 1998, pp. 350-355.
Ma et al., "Progressive and Interactive Analysis of Event Data Using Event Miner", 2002 IEEE Online Library, pp. 661-664.
Rosner et al., "In Touch: A Graphical User Interface Development Tool", IEEE Online Library, 1990, pp. 12/1-12/7.
Sarukkai et al., "Parallel Program Visualization using SIEVE.1", ACM Digital Library, 1992, pp. 157-166.
Wang, "Team-and-Role-Based Organizational Context and Access Control for Cooperative Hypermedia Environments", ACM Digital Library, 1999, pp. 37-46.

(Continued)

*Primary Examiner* — Andrew Georgandellis
(74) *Attorney, Agent, or Firm* — Yee & Associates, P.C.; Jeffrey S. LaBaw

(57) ABSTRACT

A method for graphically representing events at runtime in an event management system is provided. A plurality of events including a first event and a second event are received that define respective states of one or more networked devices. A cause-effect event relation is identified between the first event, the second event, and a projected event responsive to receiving the first and second events. A runtime visualization output is generated that includes a graphical representation of the first event, the second event, the projected event and the event relation.

20 Claims, 4 Drawing Sheets

(56) References Cited

OTHER PUBLICATIONS

Gi Won On et al., "An integrated dynamic and visual debugging for parallel applications", Parallel Computing: Fundamentals, Applications and New Directions, Advances in Parallel Computing, vol. 12, pp. 335-338; Published Amsterdam, Netherlands, 1998.

Evans et al., "A visual performance analysis environment", Parallel Computing '91. Proceedings of the International Conference, pp. 515-529; Published Amsterdam, Netherlands, 1992.

IBM Research Disclosure n42895, "XML Element Forms: Building Blocks of XML-Based Applications", p. 1658-1659, Dec. 1999.

IBM Research Disclosure 41780, v42, n417, "A Runtime Notification Service Tool which Visually Display the Events Flow Through the Event Network to Help User Detect Un-Connected Objects in the Network Channel Application", Jan. 1999.

http://www.open.com/pdf/nervecenter_datasheet.pdf, "Advanced Event Correlation and Root Cause Analysis for Enterprise Networks", Open Network Security Management, Apr. 9, 2004, 2 pages.

Kovalerchuk, "Review of Visual Correlation Methods", Version 03.06.2001, http://www.cwu.edu/~borisk/visualization/review2b.pdf, Apr. 9, 2004, 11 pages.

Yemini et al., "High Speed & Robust Event Correlation", http://www1.cs.columbia.edu/ids/research/keypapers/papers/eventcorrelation/ieee.pdf, Apr. 9, 2004, pp. 1-23.

* cited by examiner

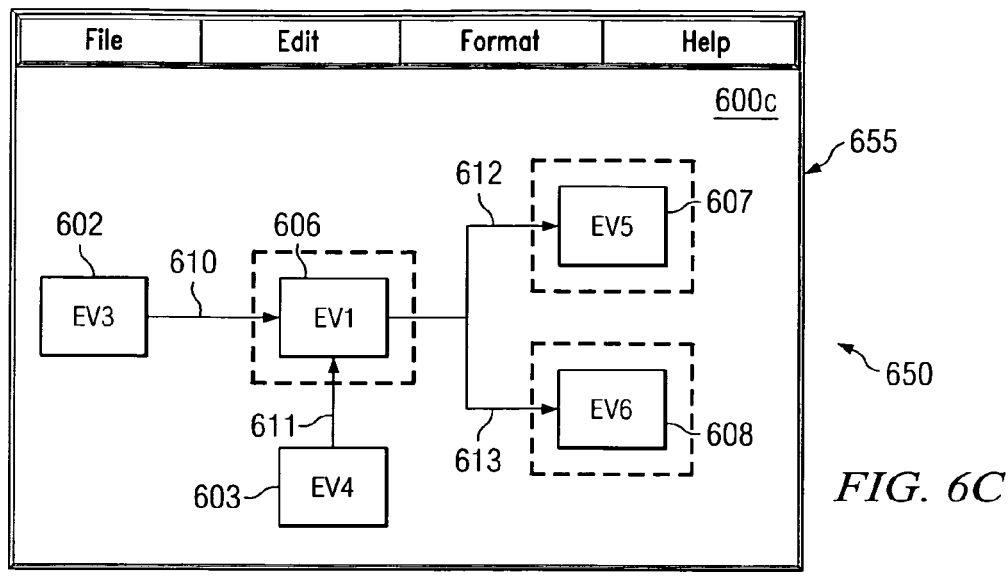
FIG. 6C
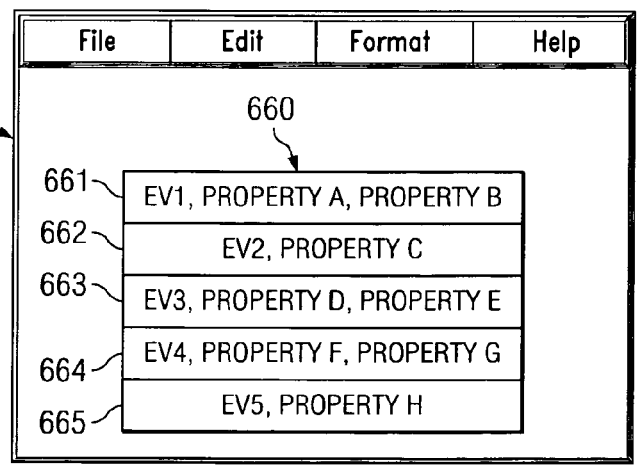
FIG. 6D
FIG. 7

GENERATING VISUALIZATION OUTPUT OF EVENT CORRELATION INFORMATION

BACKGROUND OF THE INVENTION

1. Technical Field

The present invention relates generally to an improved data processing system and in particular to a method and data processing system for managing networked systems. Still more particularly, the present invention provides a method and apparatus for analyzing events and for visualizing cause and effect correlation information among multiple events at runtime in a networked system.

2. Description of Related Art

As distributed or networked systems become increasingly complex, effective management and evaluation of a networked system progressively increases in difficulty. In typical networked systems, a system manager monitors critical activities of network systems and applications.

A common approach to networked systems management is implementation of an event management system (EMS). An EMS is a system that receives system state information and that takes a corrective action in response to an indication of an undesirable system state. Event messages (referred to herein as "events") indicative of a system state are sent to the EMS, and the EMS parses the event and takes a particular corrective action. The corrective action may be, for example, a maintenance command that is executed on one or more particular networked devices, or a message to a network manager that indicates the event such that the network manager may take a corrective action.

In general, an EMS contains a correlation engine that identifies relations among events. Subject matter experts, such as a network engineer or administrator, write correlation rules that the EMS evaluates for identification of the relations. A correlation rule may specify a corrective action based on the event.

In addition to a correlation engine, a conventional EMS includes an event console that provides a display of events in real-time. Display of events is provided as a list of independent elements. Each element is associated with a single event and contains various event properties. An event displayed by an event console contains no indication of any relationship with another event. Rather, relations among events is specified only by correlation rules written by the subject matter expert. Thus, an event console provides no visual indication to a user, e.g., a network manager, of the correlation among events, such as a cause and effect relationship, that may exist between events displayed by the event console. Due to the complexity of networked systems and event relations, it is difficult to ascertain events that may occur as a result of received events.

Thus, it would be advantageous to provide a method for generating visualization output of event correlation information among events in a networked system. It would be further advantageous to provide a mechanism for providing a runtime visualization output of cause and effect relationships of multiple events received in a networked system and event relations derived from the received events.

SUMMARY OF THE INVENTION

The present invention provides a method for graphically representing events at runtime in an event management system. A plurality of events including a first event and a second event are received that define respective states of one or more networked devices. A cause-effect event relation is identified between the first event, the second event, and a projected event responsive to receiving the first and second events. A runtime visualization output is generated that includes a graphical representation of the first event, the second event, the projected event and the event relation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6C is a diagrammatic illustration of an exemplary runtime visualization output generated by the event console of the event management system described with reference to FIG. 4 after interrogation of an event relation database with a projected event in accordance with a preferred embodiment of the present invention;

FIG. 6D is a diagrammatic illustration of a visualization output depicting a list mode of event information in accordance with a preferred embodiment of the present invention; and FIG. 7 is a diagrammatic illustration of a return data set identifying a projected event that is generated by interrogation of the event relation database when interrogated with antecedent events in accordance with a preferred embodiment of the present invention.

DETAILED DESCRIPTION OF THE PREFERRED EMBODIMENT

Figure 1:
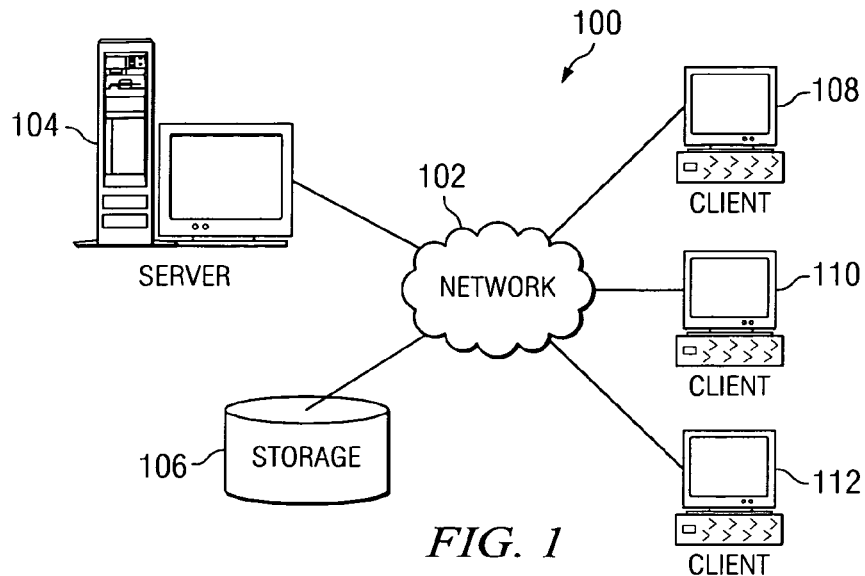
FIG. 1 is a pictorial representation of a network of data processing systems in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. Clients 108, 110, and 112 or other network devices transmit events to server 104 by way of network 102. Server 104 runs an EMS and provides a graphical display of relations among received events and anticipated events as described more fully below.

Figure 2:
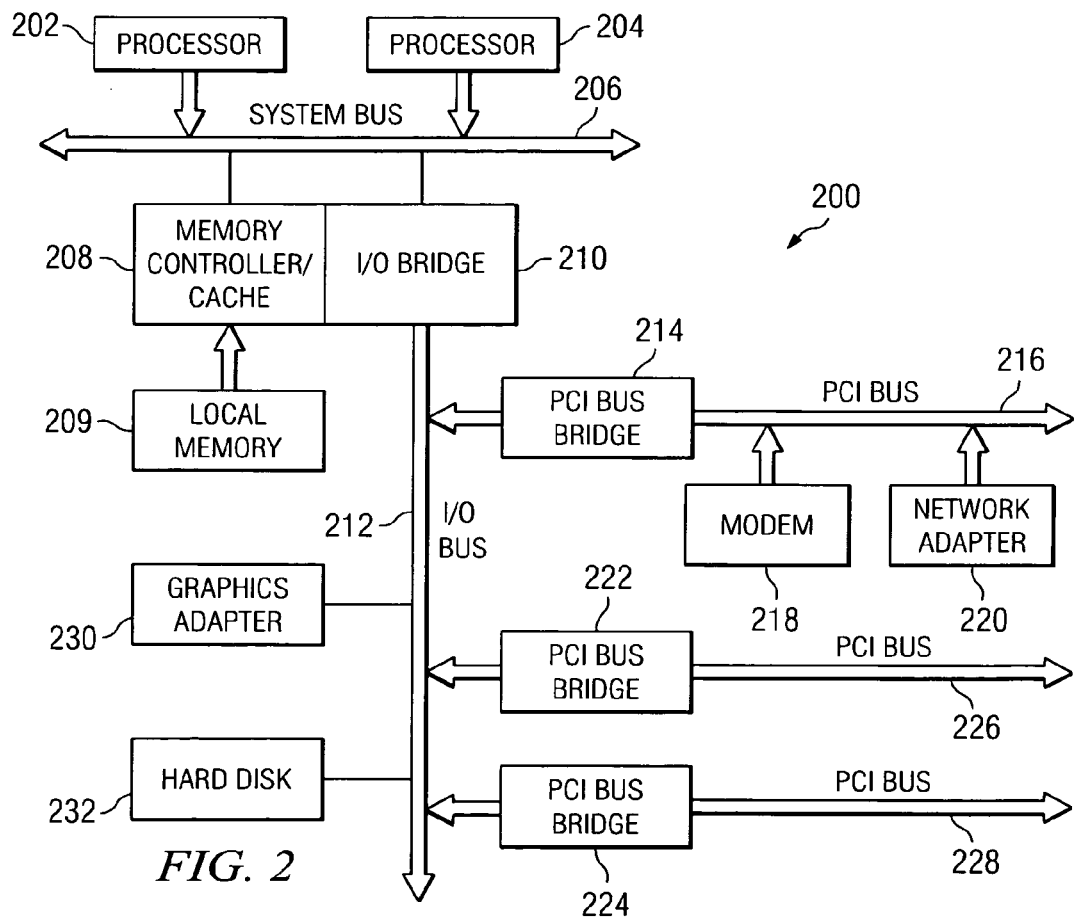
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
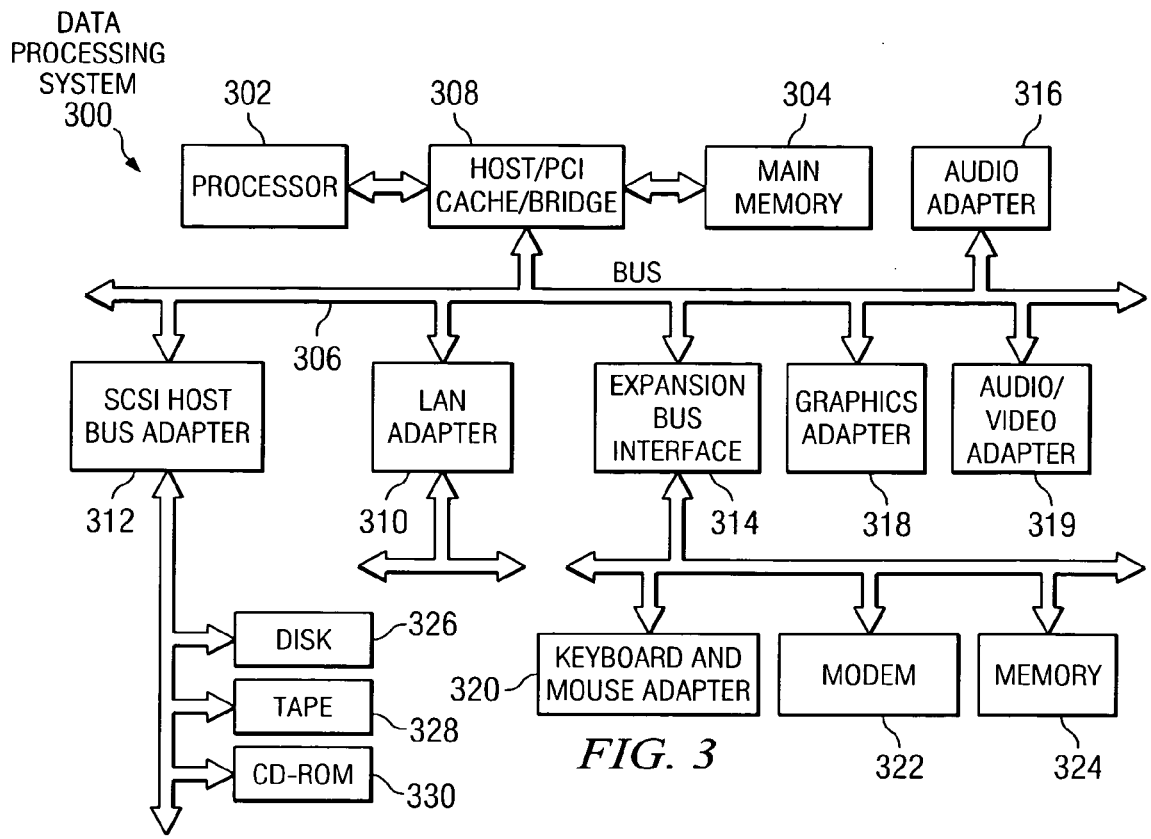
FIG. 3 is a block diagram illustrating a data processing system that may be implemented as a client in the network of data processing systems of FIG. 1 according to a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
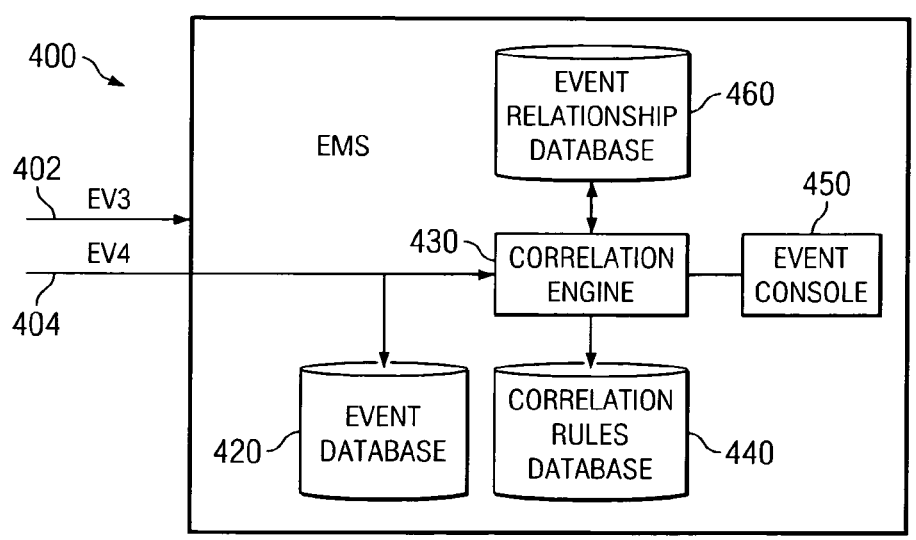
FIG. 4 is a block diagram illustrating components of an event management system implemented according to a preferred embodiment of the present invention.

FIG. 4 is a block diagram illustrating components of an EMS implemented according to a preferred embodiment of the present invention. As shown in FIG. 4, EMS 400 comprises an event database 420, correlation engine 430, correlation rules database 440, event console 450, and event relation database 460. EMS 400 is implemented as a computer program product comprising one or more executable instruction sets that may be stored on hard disk 232 of data processing system 200 of FIG. 2 and processed by a processor, such as processor 202 or 204.

Events are conveyed to EMS 400 from the devices of the network 102 shown in FIG. 1. In the illustrative example, a first event (EV3) 402 is received by EMS 400, and a subsequent event (EV4) 404 is later received by EMS 400. The events may be placed into event database 420. Event database 420 is a repository that may be accessed by, for example, a structured query language (SQL) front end or interface. Event database 420 stores events and associated properties. An event may, for example, be stored as a record of a table, and properties of events may be stored as fields of corresponding event records. Other data structures may be suitably substituted for event database 420.

Events are input into event database 420 in a syntax compatible with correlation engine 430. Event database 420 may be utilized by an correlation miner or other application that analyzes events and facilities formulation of new correlation rules or causal relations.

Additionally, received events are input to correlation engine 430 that accesses rules of correlation rules database 440 to determine actions to take. Correlation engine 430 interprets rules that express or define a situation of interest such as an event pattern or sequence and an action to take in response to the event pattern. In general, correlation engine 430 receives one or more events, or data derived therefrom, and interrogates correlation rules database 440 with the event data at runtime. An action to take in response to the interrogation is then retrieved from the correlation rules database 440.

Correlation engine 430 also interfaces with event relation database 460. In accordance with a preferred embodiment of the present invention, event relation database 460 stores rules that define correlations among events. For example, rules of event relation database 460 may define cause and effect relations among events. Other rules may define relations such as clearing relations among events. While event relation database 460 is illustratively shown as a discrete data structure independently accessed by correlation engine 430, causal relation database 460 may alternatively be integrated with event database 420 or correlation database 440. It should be understood that the illustrated software architecture of FIG. 4 is exemplary only and is not intended to imply an architectural limitation of the present invention.

Event console 450 receives analysis data from correlation engine 430 for generation of event visualization output on a display device at runtime. Event data provided to event console 450 by correlation engine 430 may include data representative of an event received by correlation engine 430, event property data of the received event retrieved from event database 420, action data that indicates a suggested action to take in response to the received event or an anticipated event, and event correlation information obtained from interrogation of event relation database 460.

Figure 5:
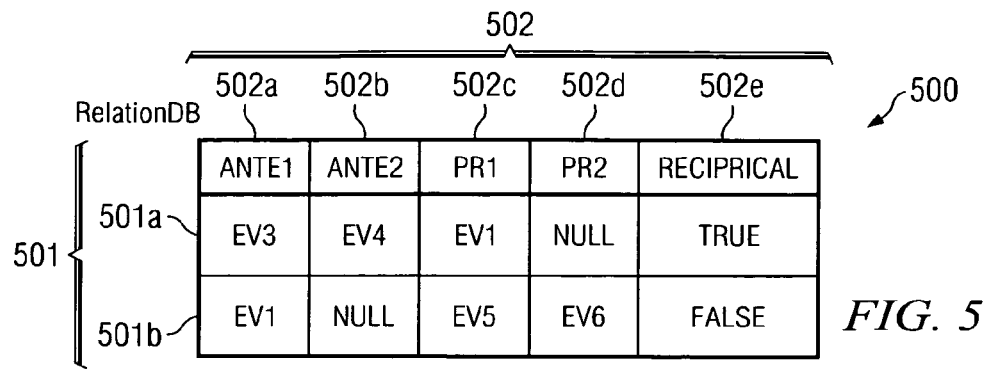
FIG. 5 is a diagrammatic illustration of an implementation of an event relation database of the event management system described with reference to FIG. 4 implemented in accordance with a preferred embodiment of the present invention.

FIG. 5 is a diagrammatic illustration of an implementation of event relation database 460 of FIG. 4 implemented in accordance with a preferred embodiment of the present invention. Table 500 comprises a plurality of records 501 and 502. Table 500 may be stored on hard disk 232, fetched therefrom by processor 202, and processed by data processing system 200 shown in FIG. 2. Each record, such as records 501*a*-501*b*, or row, comprises data elements in respective fields 502*a*-502*d*.

Table 500 has a label, or identifier, assigned thereto. In the present example, table 500 has a label of "RelationDB". Fields 502*a*-502*d* each have a respective label, or identifier, that facilitates insertion, deletion, querying, or other data operations or manipulations of table 500. In the illustrative example, fields 502*a*-502*d* have respective labels of "Ante1", "Ante2", "PR1", and "PR2". A particular field, or fields, e.g., fields 502*a* and 502*b*, may be designated as a key and each respective data element, or the combination of data elements of the key fields, is unique within the key fields. Addressing a particular record, such as records 501*a*-501*b*, via an associated key data element is referred to as indexing of the record. Alternatively, a key may be obtained by a function, e.g., a hashing function, that indexes a particular record, such as records 501*a*-501*b*.

Records 501*a*-501*b* define respective event relations that may be identified by correlation engine 430 responsive to receipt of events. Particularly, the exemplary event relations defined by records 501*a*-501*b* are causal relations that define cause and effect relationships among events. In the illustrative example, an event relation is defined by one or more antecedent events and one or more associated projected events. As referred to herein, an antecedent event is an event that may cause or induce the occurrence of one or more other events. An antecedent event may be sufficient for causing another event occurrence, or an antecedent event may require one or more other antecedent-events to cause the occurrence of another event. An event that may be anticipated to occur as the result of the occurrence of one or more antecedent events is referred to herein as a projected event. Additionally, an event may be an antecedent event and a projected event. For example, the occurrence of an event may be induced by another event, and the induced event may itself result in the occurrence of another event. Table 500 is accessed upon receipt of an event for a runtime identification of event relations. In the illustrative example, fields 502*a* and 502*b* define antecedent events that are associated with projected events defined in fields 502*c* and 502*d*. For example, record 501*a* defines a causal relation having two antecedent events (EV3 and EV4) associated with a projected event (EV1). In a similar manner, record 501*b* defines a causal relation having a single antecedent event (EV1) with two associated projected events (EV5 and EV6). It should be understood that the causal relations shown and described are exemplary only, and the present invention is not limited to any particular types of event relations.

Upon receipt of an event, correlation engine 430 interrogates table 500 with the received event. The received event, or a derivation thereof such as a unique event identifier, is used by correlation engine 430 to formulate a query that is submitted to table 500. Assume correlation engine 430 has received event EV3. Correlation engine 430 may generate, for example, an SQL query such as the following:

```
SELECT PR1, PR2
FROM RelationDB
WHERE (ANTE1="EV3")
AND (ANTE2="Null")
```

In the present example, a null return data set would be generated as no causal relations are defined having event EV3 as a single causal antecedent.

Figure 6A:
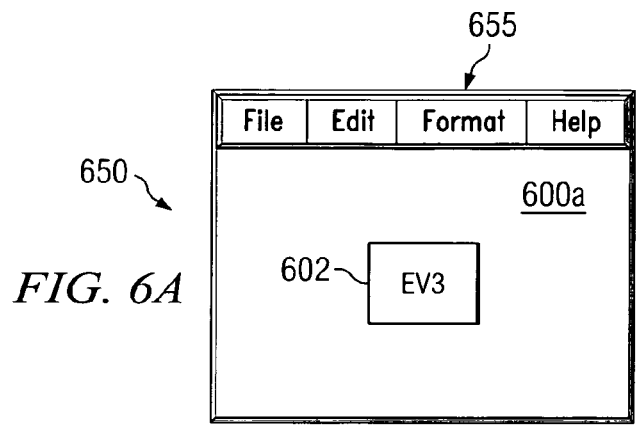
FIG. 6A is a diagrammatic illustration of an exemplary runtime visualization output generated by an event console of the event management system described with reference to FIG. 4 upon receipt of an event in accordance with a preferred embodiment of the present invention.

Correlation engine 430 may then supply the received event EV3, or data derived therefrom, to event console 450 for runtime generation of visualization output. Additionally, property data associated with the event may be conveyed to event console 450 as well. In a preferred embodiment, a runtime visualization output representative of events is generated as nodes of a directed graph. For example, FIG. 6A is a diagrammatic illustration of an exemplary runtime visualization output comprising graphical user interface (GUI) 650 generated by event console 450 of FIG. 4 upon receipt of an event in accordance with a preferred embodiment of the present invention. Runtime visualization output 600a includes an event representation 602 provided as a graph node representative of the received event EV3 that is displayed in window 655. In the present example, no projected event is associated with single causal event EV3. Accordingly, event representation 602 is graphically output as a single graph node.

Returning again to FIG. 4, a second event EV4 is received by correlation engine 430 subsequent to receipt of event EV3. Correlation engine 430 again formulates an SQL query that is submitted to causal relation database 460. For example, the following SQL query may be generated for submission to event relation database 460 that evaluates whether events 402 and 404 may induce the occurrence of one or more projected events:

```
SELECT PR1, PR2
FROM RelationDB
WHERE (ANTE1="EV3" OR "EV4")
AND (ANTE2="EV3" OR "EV4")
```

FIG. 7 is a diagrammatic illustration of a return data set identifying a projected event that is generated by interrogation of event relation database 460 when interrogated with antecedent events EV3 and EV4 in accordance with a preferred embodiment of the present invention. As shown, return data set 700 includes an identification of projected event EV1. Return data set 700 identifies event EV1 as a projected event that may be anticipated to occur due to the receipt of events 402 and 404. Additionally, correlation engine 430 may interrogate event relation database 460 to determine if event EV4 is a single antecedent event associated with one or more projected events in a manner similar to that described above with reference to the SQL query generated on receipt of event EV3.

Figure 6B:
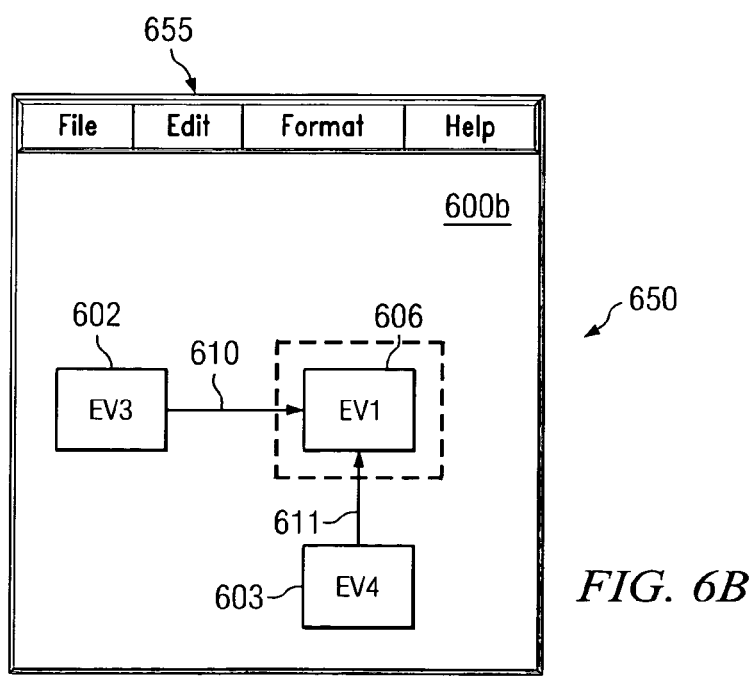
FIG. 6B is a diagrammatic illustration of an exemplary runtime visualization output generated by the event console of the event management system described with reference to FIG. 4 upon receipt of events and identification of an associated projected event in accordance with a preferred embodiment of the present invention.

Correlation engine 430 may then convey the received event EV4 and projected event EV1 to event console 450. Properties of events EV4 and EV1 may be conveyed to event console 450 as well. Event console 450 updates the runtime visualization output to include the most recently received event and the projected event associated with the received events. Additionally, the event relation among the events is included in the runtime visualization output. For example, FIG. 6B is a diagrammatic illustration of an exemplary runtime visualization output generated by event console 450 of FIG. 4 upon receipt of events EV3 and EV4 and identification of projected event EV1 in accordance with a preferred embodiment of the present invention. Runtime visualization output 600b includes event representations 602 and 603 provided as graph nodes representative of received event EV3 and EV4, respectively. Projected event EV1 is represented by event representation 606. Thus, a runtime visualization output is generated that includes respective representations of a plurality of events, e.g., EV3 and EV4, that have occurred and an event that is projected to occur due to the cause-effect relation between the events.

In the illustrative example, the causal relation between antecedent events EV3 and EV4 and projected event EV4 is represented by directed edges 610 and 611 respectively connecting event representations 602 and 603 with event representation 606. Particularly, an antecedent event is graphically represented as a source node of a directed edge connecting the antecedent event with the associated projected event, and a projected event is graphically represented as a target node of the directed edge. Moreover, event representation 606 of event EV1 may be graphically designated as a projected event. For example, event representation 606 is illustratively designated as a projected event by dashed lines enclosing event representation 606. However, any manner of graphic designation may be used to distinctly designate the runtime visualization output of an event representation of received events and projected events. For example, the graph nodes comprising event representations may be assigned a particular color indicative of a received event or a projected event.

In accordance with another embodiment of the present invention, a projected event may be used to interrogate event relation database 460. For example, upon identification of EV1 as a projected event, correlation engine 430 may use the projected event EV1 to interrogate event relation database 460 for additional projected events. In the illustrative example, projected events EV5 and EV6 are returned to correlation engine 430 as a return data set upon interrogation of event relation database 460 with the projected event EV1. Accordingly, correlation engine may provide events EV5 and EV6 to event console 450 for update of the runtime visualization output.

For example, FIG. 6C is a diagrammatic illustration of runtime visualization output 600c after receipt of events EV3 and EV4 and one or more subsequent interrogations of event relation database 460 in accordance with a preferred embodiment of the present invention. As shown, projected events EV5 and EV6 are represented by event representations 607 and 608. Events EV5 and EV6 are graphically designated as projected events by dashed lines encompassing the event representations 607 and 608. The causal relation between projected event EV1 and projected events EV5 and EV6 is designated by directed edges 612 and 613 connecting event representation 606 with event representations 607 and 608. Thus, projected event EV1 is graphically designated as an antecedent event of projected events EV5 and EV6 by way of the graphic representation of the causal relation among events EV1, EV5 and EV6.

FIG. 6D is a diagrammatic illustration of a visualization output depicting a list mode of event information in accordance with preferred embodiment of the present invention. GUI 650 is representative of a runtime visualization output that may be generated by event console 450 after identification of event relations after receipt of events EV3 and EV4. GUI 650 comprises event list 660 having event rows 661-665 that provide identification of events and associated event properties. Events included in event rows 661-665 may include received events and events derived from interrogation of event relation database 460. Additionally, properties of events identified by event database 420 of FIG. 4 may be displayed in GUI 650. Event list 660 may be displayed concurrently with visualization output depicting event relations, such as visualization output 600c of FIG. 6C, or alternatively GUI 650 may be toggled between runtime visualization output of event relations and event list 660.

As described, a method and computer program product for generating runtime visualization output depicting event relations among events in a networked system is provided. Events are received by an event management system and event representations of the received events are generated in a runtime visualization output. An event relation database defining relations among events is interrogated with the received event. Event relations identified from the interrogation of the event relation database is graphically represented in the runtime visualization output. The visualization output includes a runtime graphic representation of the events and event relations. The runtime visualization output may include representations of a plurality of received events and one or more projected events identified by a cause-effect relation between the plurality of received events and the projected event. Advantageously, a user may easily identify networked system events and event relations.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method for graphically representing events at runtime in an event management system, the method comprising the computer implemented steps of:
   receiving a plurality of events including a first event defining a state of a networked device and a second event defining a state of another networked device;
   storing the plurality of events in an event database;
   responsive to receiving the first event and the second event, (1) identifying an action to take by interrogating, by a correlation engine, a correlation rules database, and (2) identifying an event relation between the first event, the second event and a projected event, wherein the step of identifying the event relation includes (i) interrogating, by the correlation engine using the first event and the second event, an event relation database having a plurality of records each defining at least one event, and (ii) receiving, by the correlation engine, a return data set including an identification of the event relation between the first event, the second event and the projected event;
   responsive to receiving the return data set, identifying another event relation between the projected event and another projected event, wherein the step of identifying the another event relation between the projected event and the another projected event includes (i) interrogating, by the correlation engine, the event relation database using the projected event received in the return data set, and (ii) receiving, by the correlation engine, a second return data set including the another projected event;
   retrieving, from the event database, property data associated with the first event, the second event, and the projected event;
   sending, by the correlation engine to an event console, the property data, the return data set and the second return data set; and
   generating a runtime visualization output by the event console that includes a graphical representation of the first event, the second event, the projected event, the another projected event, the property data, and the event relation, wherein the step of generating the runtime visualization output includes graphically outputting a graph having a first node representative of the first event, a second node representative of the second event, a third node representative of the projected event, and a fourth node representation of the another projected event.

2. The method of claim 1, wherein the second return dataset includes a plurality of another projected events.

3. The method of claim 1, wherein the step of graphically outputting includes:
   graphically outputting a graph edge connecting the first node and the third node, wherein the graph edge is a graphical representation of the event relation, wherein the first node is a source node of the graph edge, and the third node is a target node of the graph edge; and
   graphically outputting another graph edge connecting the third node and the fourth node.

4. The method of claim 1, wherein the graphical representation of the first event is graphically distinct from the graphical representation of the projected event.

5. A computer program product in a computer readable medium for graphically representing events at runtime in an event management system, the computer program product comprising:
   first instructions for receiving a first event defining a state of a networked device and a second event defining a state of another networked device;
   second instructions for storing the plurality of events in an event database;
   third instructions for interrogating a correlation rules database to identify an action to take in response receiving the first event and the second event;
   fourth instructions for interrogating an event relation database using the first event and the second event, wherein the event relation database defines a cause-effect event relation between the first event, the second event, and an associated event, wherein the fourth instructions, responsive to interrogating the database, receive a return data set including an identifier of the associated event;
   fifth instruction for interrogating, using the identifier of the associated event, the event relation database that defines a cause-effect event relation between the associated event and another associated event;
   sixth instructions for retrieving property data associated with the first event, the second event, and the associated event; and
   seventh instructions for generating respective graphical representations of the first event, the second event, the associated event, the another associated event, the property data, and the event relation, wherein the graphical representations comprise a directed graph, and wherein the graphical representations of the first event, the second event, the associated event, and the another associated event are respective graph nodes of the directed graph.

6. The computer program product of claim 5, wherein the graphical representation of the event relation comprises a directed edge from the graphical representation of the first event and the second event to the graphical representation of the associated event, and further comprises a directed edge from the graphical representation of the associated event to the graphical representation of the another associated event.

7. The computer program product of claim 5, wherein the graphical representation of the first event and the second event is graphically distinct from the graphical representation of the associated event.

8. The computer program product of claim 5, wherein the fourth instructions are adapted to index a record with an identifier of the first event and the second event.

9. A data processing system for graphically representing events in an event management system at runtime, comprising:
  a memory that contains a set of instructions and an event relation database defining (i) an event relation between a first event, a second event, and an associated event in a record of the event relation database, (ii) another event relation between the associated event and another associated event in another record of the event relation database;
  a network adapter adapted to receive event messages from networked devices, including a first event and a second event; and
  a processing unit, responsive to execution of the set of instructions, that (i) stores the event messages in an event database; (ii) identifies an action to take by interrogating a correlation rules database, (iii) reads the first event and the second event conveyed to the network adapter and formulates a query that includes an identifier of the first event and the second event, (iv) receives the associated event from the event relation database, (v) formulates another query that includes an identifier of the associated event, (vi) receives the another associated event from the event relation database, and (vii) retrieves property data associated with the first event, the second event, and the associated event from the event database, wherein the processing unit generates a runtime visualization output including a respective graphical representation of the first event, the second event, the associated event, the another associated event, the property data, and the event relation responsive to execution of the query and the another query.

10. The data processing system of claim 9, wherein the database comprises a plurality of records each respectively defining a causal relation between a plurality of events.

11. The data processing system of claim 9, wherein the associated event is identified in a return data set upon submission of the query to the database.

12. The data processing system of claim 9, wherein the graphical representations of the first event, the second event, the associated event, the another associated event, the property data, and the event relation comprise a directed graph.

13. The data processing system of claim 9, wherein the graphical representation of the first event and the second event is distinguished from the graphical representation of the associated event.

14. The method of claim 1, wherein the event relation database stores rules that define correlations among given events, and the correlation engine interrogates the event relation database using a database query that is formulated by the correlation engine and includes the first event and the second event.

15. The method of claim 14, wherein the database query is a structured query language (SQL) database query that is formulated by the correlation engine and includes the first event and the second event.

16. The method of claim 14, wherein the correlation rules database stores rules that define actions to take for the given events.

17. The computer program product of claim 5, wherein the event relation database stores rules that define correlations among given events, and the correlation engine interrogates the event relation database using a database query that is formulated by the correlation engine and includes the first event and the second event.

18. The computer program product of claim 17, wherein the database query is a structured query language (SQL) database query that is formulated by the correlation engine and includes the first event and the second event.

19. The computer program product of claim 17, wherein the correlation rules database stores rules that define actions to take for the given events.

20. The data processing system of claim 9, wherein the event relation database stores rules that define correlations among given events, and the correlation engine interrogates the event relation database using a database query that is formulated by the correlation engine and includes the first event and the second event.

* * * * *